United States Patent [19]

Omeis et al.

[11] Patent Number: 5,266,615
[45] Date of Patent: Nov. 30, 1993

[54] ALKYL (METH)ACRYLATE-MALEIC ANHYDRIDE COPOLYMER-MODIFIED BITUMEN

[75] Inventors: Juergen Omeis, Bickenbach; Michael Mueller, Bensheim; Horst Pennewiss, Darmstadt, all of Fed. Rep. of Germany

[73] Assignee: Roehm GmbH Chemische Fabrik, Darmstadt, Fed. Rep. of Germany

[21] Appl. No.: 930,894

[22] Filed: Aug. 17, 1992

[30] Foreign Application Priority Data

Aug. 29, 1991 [DE] Fed. Rep. of Germany ....... 4128640

[51] Int. Cl.$^5$ .................................... C08L 95/00
[52] U.S. Cl. ........................................ 524/69; 524/60; 524/68; 524/71
[58] Field of Search ..................... 524/69, 68, 71, 60

[56] References Cited

U.S. PATENT DOCUMENTS

| | | |
|---|---|---|
| 2,420,082 | 5/1947 | Klinger . |
| 2,828,429 | 3/1958 | Creonti . |
| 4,026,854 | 5/1977 | Buechner et al. ............... 524/69 |
| 4,451,598 | 5/1984 | Decroix ............................ 524/69 |
| 4,650,820 | 3/1987 | Decroix ............................ 524/69 |
| 5,126,383 | 6/1992 | Muller et al. ..................... 524/69 |

FOREIGN PATENT DOCUMENTS

| | | |
|---|---|---|
| 0096614 | 12/1983 | European Pat. Off. . |
| 0400391 | 12/1990 | European Pat. Off. . |
| 0400437 | 12/1990 | European Pat. Off. . |
| 4040234.7 | of 0000 | Fed. Rep. of Germany . |
| 1188807 | 3/1965 | Fed. Rep. of Germany . |
| 2331727 | 1/1975 | Fed. Rep. of Germany . |
| 2509473 | 9/1976 | Fed. Rep. of Germany . |
| 1240773 | 5/1987 | Fed. Rep. of Germany . |
| 3917816 | 6/1989 | Fed. Rep. of Germany . |
| 4006499 | 3/1990 | Fed. Rep. of Germany . |
| 3917815 | 12/1990 | Fed. Rep. of Germany . |
| 3925827 | 2/1991 | Fed. Rep. of Germany . |
| 52141829 | 11/1977 | Japan . |
| 6279268 | 4/1987 | Japan . |
| WO87/04174 | 7/1987 | PCT Int'l Appl. . |
| WO88/07067 | 9/1988 | PCT Int'l Appl. . |

*Primary Examiner*—Paul R. Michl
*Assistant Examiner*—Edward Cain
*Attorney, Agent, or Firm*—Oblon, Spivak, McClelland, Maier & Neustadt

[57] ABSTRACT

The present invention provides a polymer-modified bitumeniferous composition containing polymer components in the amount of 0.5–50 wt. %, wherein 20–100 wt. % of the polymeric additive is a copolymer comprises of units of: $C_6$–$C_{28}$-alkyl (meth)acrylates in the amount of 80–99.9 wt. %, maleic anhydride in the amount of 0.1–20 wt. %, and other polymerizable compounds in the amount of 0–19.9 wt %. The polymer-modified bitumens exhibit excellent and persistent homogeneity, high elastic resilience, and a good range of plasticity.

9 Claims, No Drawings

ALKYL (METH)ACRYLATE-MALEIC ANHYDRIDE COPOLYMER-MODIFIED BITUMEN

BACKGROUND OF THE INVENTION

Field of the Invention

The present invention relates to polymers based on polyalkyl (meth)acrylates, which may be used as upgrading agents for bitumen, and for bitumen modified with such polymers, which has improved properties.

Description of the Background

Bitumen, which is a mixture of essentially different hydrocarbons with varying contents of paraffinic, naphthenic, and aromatic hydrocarbons, has numerous uses as a consequence of its particular properties. Thus, it is used in producing road surfaces, as a sealing and gap-filling compound, as a coating, as a protectant for structures (possibly in the form of roofing paper), or as a sealant against ground water.

The peculiar properties of the product (bitumen has elastic parameters in the low to zero range depending on the crude oil from which it is obtained) cause pavement layers produced with it to be brittle at low temperatures and soft at higher temperatures.

Various additives, particularly polymers, have been employed to attempt to upgrade bitumen, particularly its rheological properties, so that, e.g., asphalt, which is a mixture of bitumen and mineral materials used particularly in road building, will have the requisite stability and cold flexibility as well as durability under increasing traffic loads. Thus, addition of polymers can increase the so-called "plasticity range", which is the difference between the softening point and the Fraass breaking point (DIN 52 103). When polymer addition results in a reduced Fraass breaking point and an increased ductility (DIN 52 013), this indicates that the modified material will display improved cold flexibility. The purpose of the polymer as a bitumen-additive is to alter the visco-elastic behavior of the bitumen, i.e., to increase its plasticity range and improve its elastic resilience.

Polymers which have been studied as bitumen upgrading agents include not only natural and synthetic rubbers but also duroplastic resins and thermoplastics (Koerner et al., 1977 *Plaste und Kautschuk*, 24, 475–478). The principal polymeric bitumen-upgrading agents used industrially, heretofore, are styrene-butadiene copolymer (SB), EPDM copolymer, ethylene-vinyl acetate (EVA) copolymer, and, particularly for industrial bitumen, atactic polypropylene. Commercial PmBs include Caribit ® (SB, Shell), Olexobit ® (EPDM, BP), and Styrelf ® (SB, Elf).

Polymers based on acrylic acid esters and methacrylic acid esters, particularly polymers of alkyl methacrylic acid esters (PAMA), have been described as upgrading agents for bitumen. These polymers have not found wide use in the industry, however, despite the fact that they satisfy a number of requirements as additives. The principal reason is that they do not sufficiently improve the elastic resilience of the final elastomer-modified bitumen product.

Thus, U.S. Pat. No. 2,420,082 describes bitumeniferous mixtures containing bitumen and 2-5% of poly-$C_8$-$C_{10}$-alkyl methacrylates of unspecified molecular weights. The ductility of the bitumen is improved.

U.S. Pat. No. 2,828,429 discloses bitumeniferous mixtures containing rubber and poly-$C_8$-$C_{24}$-alkyl (meth)acrylates, each being present in the amount of 0.01-0.5%. The mixtures have improved ductility. The PAMAs here have molecular weights of 5,000 to 500,000.

Ger. AS 12 40 773 and OS 23 31 727 describe bitumeniferous binders for road surfaces which binders are also upgraded with alkyl methacrylate polymers; however, detailed data on the polymers are lacking.

Polyalkyl (meth)acrylates and copolymers of alkyl (meth)acrylates are proposed as bitumen upgrading agents in Ger. OS 25 09 473. A mixed polymer is described, which is solid at normal temperature and non-sticky, and having a molecular weight of 50,000 to 500,000, containing alkyl (meth)acrylates with alkyl groups having >6 C atoms, and further containing of units of acrylic acid or methacrylic acid in the amount of 3-20 wt. % and units of monomers containing basic nitrogen, also in the amount of 3-20 wt. %. Ger. OS 39 17 816 and 39 25 827 describe mixed polymers containing the same components but the amounts of the carboxylic acid units and the units of basic nitrogen compounds are each <2.8 wt. %.

Jap. OS 52-141,829 discloses stagewise emulsion-polymerized additives, and PCT Pat. 88/07,067 discloses poly-$C_4$-$C_{20}$-alkyl methacrylates with molecular weights of c. 5,000 to c. 1,000,000 which are contained in the modified bitumen in amounts of 0.01 wt. % to c. 10 wt. %. Poly-$C_8$-$C_{26}$alkyl (meth)acrylates with molecular weights $Mw > 10^6$ are known as bitumen-modifying polymers from Ger. OS 39 17 815.

Olefinic copolymers, particularly containing units of acrylic acid and/or methacrylic acid as reactive comonomers, are described as additives for bitumeniferous materials in Ger. AS 11 88 807 and in PCT Pat. 87/04,174. Also, Jap. Pat. 62-79,268 discloses copolymers of isobutylene and/or styrene and/or lower acrylic acid esters with maleic acid or maleic anhydride.

Ionically crosslinked, substantially homogeneously distributed poly(meth)acrylate systems in bitumens may be obtained, according to Ger. Pat. App. P 40 06 499.9, in a two stage procedure by mixing-in acid-group-containing polymers and then mixing-in reactive metal compounds. Bitumens containing covalently cross-linked, homogeneously distributed poly(meth)acrylate systems are described in Ger. Pat. App. P 40 40 234.7.

In order for the polymeric additives to be industrially practical in bitumeniferous mixtures the polymeric additives must be oxidatively and thermally stable, as well as being capable of being easily mixed into bitumen, being compatible with various types of bitumen, and imparting stability to the bitumen-polymer mixture over relatively long periods and at elevated temperatures.

The known polymeric bitumen additives sufficiently extend the "plasticity range" of bitumeniferous mixtures, including mineral-containing bitumeniferous mixtures; i.e., often the softening point and Fraass breaking point of such materials are favorably influenced by the known polymeric additives.

However, asphalts produced with bitumeniferous binders do not have adequate strength on aging or adequate elasticity (which parameters are determined by the elastic properties of the bitumen). An example of the effect of this in practice may be seen from the fact that quite often asphalt road surfaces are seriously deformed.

A particularly disadvantageous phenomenon in many types of bitumen is de-mixing with subsequent formation of polymer-rich and polymer-depleted phases when state of the art bitumen additives are employed under hot storage conditions, i.e., the PmBs do not remain homogeneous and are not storage stabile.

Thus, a need exists for bitumen additives which are compatible with the widest possible variety of bitumen types and which are, therefor, widely usable, and which avoid the above disadvantages.

SUMMARY OF THE INVENTION

Accordingly, it is an object of the present invention to provide a polymer-modified bitumen which avoids the above disadvantages.

It is also an object of the present invention to provide a method of manufacturing polymer-modified bitumen which avoids the above disadvantages.

The above objects and others are provided by a polymer-modified bitumen which exhibits homogeneity, high elastic resilience, good cold flexibility and high thermal stability, which contains polymer components in the amount of about 0.5-50 wt. %, at least 20 wt. % of which components contain polyalkyl (meth)acrylates, and wherein the polyalkyl (meth)acrylates contain units of $C_6$-$C_{28}$ (meth)acrylates in the amount of about 80 to 99.9 wt. %, maleic anhydride in the amount of about 0.1 to 20 wt. %, and one or more other components with not more than one polymerizable double bond, in the amount of 0 to 19.9 wt. %, and wherein the polyalkyl (meth)acrylates are uniformly distributed in the bitumen.

DETAILED DESCRIPTION OF THE PREFERRED EMBODIMENTS

The present invention is predicated upon the need to obtain homogeneous, storage-stabile polymer-modified bitumens (PmBs) modified with poly(meth)acrylates, which PmBs retain their homogeneity after storage at elevated temperatures and which, in general, have good mechanical and thermal properties. In particular, there is a need for poly(meth)acrylate modifying agents which exhibit homogeneity for virtually all types of bitumen as well as good technical behavior.

Surprisingly, it has been discovered that PmBs which have good homogeneity, and, more importantly, homogeneity which is durable, i.e., such that the PmB survives hot storage without de-mixing, can be prepared if certain polyalkyl (meth)acrylates are used containing maleic anhydride as a comonomer, wherewith the elastic and thermal properties of the bitumen, and thus of bitumeniferous compositions, are substantially and surprisingly improved, and the practical requirements posed are satisfied.

It is quite surprising that such PmBs, with homogeneity which is much improved, in degree and stability, can be provided as compared to PmBs containing merely ordinary PAMAs (which are described as bitumen-modifying agents in PCT Pat. 88/07,067 and Ger. OS 39 17 815). This is accomplished by using copolymers of long-chain alkyl (meth)acrylates and maleic anhydride, i.e., PAMAs containing maleic anhydride as a comonomer. Compared to the ionically or covalently cross-linked and homogeneously distributed poly(meth)acrylate systems in bitumens according to the state of the art, the polymeric additives of the present invention are distinguished by their relatively simple structure and ease of use.

In general, the present invention provides a polymer-modified bitumen (PmB) which has homogeneity (i.e., good stability to de-mixing under hot storage), high elastic resilience, good cold flexibility, and high thermal stability, containing polymer components in the amount of 0.5-50 wt. %, at least 20 wt. % of which components comprise polyalkyl (meth)acrylates (PAMAs); wherein the PAMAs contain units of $C_6$-$C_{28}$-alkyl (meth)acrylates in the amount of 80-99.9 wt. %, maleic anhydride in the amount of 0.1-20 wt. %, and one or more other compounds with not more than one polymerizable double bond, in the amount of 0-19.9 wt. %, and said PAMAs are uniformly distributed in the bitumen.

The molecular weights Mw of the $C_6$-$CH_{28}$-alkyl (meth)acrylate − maleic anhydride copolymers are advantageously in the range $\geq$ 30,000 up to c. 1,500,000. Moreover, the use of the maleic anhydride - olefin copolymers has further surprisingly favorable effects on the mechanical properties of the PmBs.

The alkyl (meth)acrylate copolymers and/or mixtures of copolymers, of which the compositions according to the invention are comprised, can be added to the bitumen or bitumeniferous mixture in the form of a solution of the additives, e.g., in a suitable mineral oil, or in pure form.

Although it is known that improved cold flexibility (as indicated by Fraass breaking point and ductility) in PmBs can be obtained by adding polyalkyl (meth)acrylates with molecular weights in the range 50,000 to c. 1,000,000; the elastic resilience and homogeneity obtained are inadequate, wherewith persistent deformations occur in the bituminous composition products (e.g., sealing rings or road surfaces), and these deformations will present substantial risks, e.g. to traffic safety. The German requirements of the Technical Terms of Delivery for finished PmB, "T1 PmB 88", Part 1, Version of Dec. 30, 1988, require elastic resilience of at least 50% for the various types of PmBs.

To test the elastic properties of finished elastomer-modified bitumen, the test of elastic resilience (ER) according to the sheared fiber method, in a ductilometer, based on the method of DIN 52,013, is carried out at 25° C., as follows:

At variance from DIN 52,013, the test bodies are drawn to a fiber length of only 20 cm, and after termination of the advance the fibers are cut in the middle into two sheared fiber halves, within 10 sec thereafter, with a scissors. The elastic resilience is defined as the distance between the two sheared fiber halves which is measured after 30 min. It is given in percent of the original elongation.

To test the homogeneity, the stability of finished PmBs to de-mixing under hot storage is determined by the following method, the so-called "tube method" ("T1 PmB").

Approximately 75 g PmB free of bubbles is poured in such a manner as to avoid bubbles into an unpainted aluminum tube of diameter 3 cm and cylindrical height 16 cm, until the tube is filled to 2/3 of its height. Before the test material has completely cooled, the open ends of the tube are pressed together and folded over multiple times to produce a hermetic seal, in such a way that no air is included. The tube thus sealed air-free and air-tight is stored vertically for 3 days at 180° C. After cooling to room temperature the tube is cooled by suitable means until the test material can be peeled or cut away from the aluminum metal. The test sample is cut into thirds based on height (i.e., bottom third, middle third, and top third). The ring and sphere softening points (DIN 52,011) are determined on the bottom and top sample pieces.

At variance with DIN 52,011, sample sizes of 25 g bitumen were regarded as sufficiently large for the determination of the softening.

A PmB is regarded as stabile to de-mixing if the difference in the ring and sphere softening points, respectively, between the bottom and top third pieces, is less than 2 K.

The Examples with comparison values according to the state of the art help to demonstrate the high elastic resilience and high homogeneity (i.e., good storage stability) of the inventive PmBs. The measuring methods and the tables of values are presented in Part B of the experimental section.

The structure of the present copolymeric additives with (meth)acrylic acid esters provides good solubility, i.e., easy miscibility into practically all types of bitumens; further, good cold flexibility; and good oxidation resistance of the present PmBs. The present PmBs are further distinguished by high ductility and broad "plasticity ranges", i.e., temperature differences between the Fraass breaking point and the softening point, measured on rings and spheres.

To produce the alkyl (meth)acrylate copolymers employed according to the present invention, long-chain alkyl esters of acrylic acid and/or particularly methacrylic acid are used as monomers wherein the alkyl groups in the ester functions have 6–28 C atoms, preferably 8–20 C atoms, particularly preferably 10–18 C atoms.

Examples of such esters are n-hexyl methacrylate, n-octyl methacrylate, 2-ethylhexyl acrylate, 2-ethylhexyl methacrylate, n-decyl methacrylate, isodecyl acrylate, isodecyl methacrylate, dodecyl methacrylate, octadecyl acrylate, octadecyl methacrylate, eicosyl methacrylate, and tricosyl methacrylate, wherewith preferably the long-chain alcohols used to produce the esters are synthetic alcohols, which generally are in the form of mixtures of different alcohols, particularly in the $C_8$–$C_{26}$ range. Alcohols of this type are commercially available, e.g., under the trade names Lorol®, Alfol®, Dobanol®, and Behenyl-SR®. An example of a technical alcohol which can be used to manufacture isodecyl methacrylate is a mixture of isomeric isodecyl alcohols with mean C-number (C)=9.9–10.3.

The present bitumen-modifying polyalkyl (meth)acrylates containing maleic anhydride as a comonomer contain 80–99.9 wt. %, preferably 90–99.5 wt. %, particularly preferably 95–99 wt. %, of units of long-chain $C_6$–$C_{28}$-alkyl esters of acrylic acid, and/or preferably methacrylic acid, wherewith advantageously these esters may contain mixtures of various $C_6$–$C_{28}$-alkyl esters. The units of the comonomer maleic anhydride are present in the amount of 0.1–20 wt. %, preferably 0.5–10 wt. %, particularly preferably 1–5 wt. %, in the copolymer or in the copolymers to be mixed.

In addition to the essential monomers contained in the present copolymeric additive, the additive may contain units of one or more other copolymerizable compounds having a double bond, in the amount of 0–19.9 wt. %, preferably 0–10 wt. %. Examples of non-essential but useful monomers for the manufacture of the copolymers to be used according to the invention are acrylates and/or methacrylates of $C_1$–$C_5$-alcohols, e.g., methyl methacrylate, isobutyl methacrylate, n-butyl acrylate, isoamyl methacrylate, and n-pentyl acrylate; also cyclopentyl methacrylate, cyclohexyl (meth)acrylate, tetrahydrofurfuryl methacrylate, and multiply alkoxylated methacrylate esters; further, acrylic acid, methacrylic acid, acrylonitrile, acrylamide, methaerylamide, styrene, vinyl acetate, and particularly nitrogen-containing, basic, polymerizable compounds, units of which are preferably contained in the polyalkyl (meth)acrylate additive in the amount of 0–10 wt. %.

As basic monomers, for example, are those with tertiary amino- or amido groups, or with basic heterocyclic groups. Monomers with a basic nitrogen atom are, among others, dialkylaminoalkyl esters or dialkylaminoalkyl amides of (meth)acrylic acid, particularly those with a total of 7–16 C atoms; and corresponding N-alkyl (meth)acrylamides. Examples are dimethylaminoethyl (meth)acrylate, dimethylaminopropyl (meth)acrylate, dimethylaminobutyl (meth)acrylate, N-methyl (meth)acrylamide, dimethylaminoethyl (meth)acrylamide, and esters or amides of the above types but with the dimethylamino group replaced with a diethylamino, dipropylamino, dibutylamino, methylethylamino, methylbutylamino, morpholino, or piperidino group. Examples of other suitable nitrogen-containing monomers are vinylpyrrolidone, vinylpyridine, vinylimidazole, vinylimidazoline, vinylpyrazolone, vinylpiperidine, and the (meth)acrylate esters of imidazolylalkanols or imidazolinylalkanols. For mixing into the bitumens the polymer components which serve to improve homogeneity and resilience, the present polyalkyl (meth)acrylates may be added to the bitumen while in solution, preferably in a suitable mineral oil, e.g., a highly viscous naphthene-based lubricating oil, or possibly in aqueous emulsion or in pure form. Accordingly, the copolymers of the present invention may be manufactured according to the known, customary methods via primarily radical polymerization of the monomers in solution or in emulsion, or possibly in the mass (see Rauch-Puntigam, H., and Voelker, Th., 1967, "Acryl- und Methacrylverbindungen", pub. Springer-Verlag, Berlin, 1967, particularly pp. 203, 207, 230–233, 238, 327).

The molecular weight Mw of the inventively employed polyalkyl (meth)acrylates should be >10,000, preferably >30,000. Mw values up to c. 1,500,000 can be achieved. The Mw is controlled, as a rule, by the amount of the polymerization initiator in relation to the polymerizable monomers, or in relation to the use of a regulator, e.g., an alkyl mercaptan. Known methods may be used, such as that of Rauch-Puntigam, H., loc. cit. The molecular weight, Mw, in g/mol of the polymer obtained, may be determined by the method of light scattering ("Ullmanns Encyklopaedie der technischen Chemie", 4th Ed., V. 15, pp. 385–287), or may be estimated from the viscosity relation $$\eta_{sp}/c = 0.0156 \times M_w^{0.645},$$

with the viscosity being measured according to DIN 7745 at 20° C. with chloroform as the solvent.

For modifying the bitumens according to the present invention, the alkyl (meth)acrylates copolymerized with maleic anhydride, with the said copolymers having molecular weights preferably >10,000, are added in the amount of 0.5–50 wt. %, preferably 0.5–20 wt. %, particularly preferably 1–15 wt. %, and more preferably 2–10 wt. %. The amount of modifying copolymer added depends on the intended use of the resulting PmB.

In addition to the alkyl (meth)acrylates copolymerized with maleic anhydride, which copolymers are essential according to the present invention, the present PmBs may contain other known polymeric compounds, as improvers for bitumeniferous binders and mixtures. Examples are polyolefins (e.g., polyethylene and polypropylene), ethylene-vinyl acetate copolymers, or ABS copolymers, wherewith the ratio of alkyl (meth)acrylate copolymer to these other polymers may be 1:0 to 1:4, by weight. According to the invention, in this category the use of olefin copolymers modified with maleic anhydride is advantageous.

The alkyl (meth)acrylates copolymerized with maleic anhydride, after said copolymers are mixed into bitumen compositions, yield PmBs according to the present invention which are homogeneous according to tests (tube test) conducted after storage at 180° C. The PmBs have elastic resilience up to c. 56–90%, as compared to values of c. 30–55% obtained according to the state of the art.

The term "bitumen" in the context of the present invention should be understood to mean any and all bitumens usable, e.g., in roadbuilding or roofing, or as a casting compound, sealing compound, or coating composition.

In the Examples hereinbelow, there are descriptions of the manufacture of the alkyl (meth)acrylates copolymerized with maleic anhydride, the manufacture of the inventive bitumen-polymer mixtures (PmBs), and the properties of the PmBs. Corresponding comparison examples according to the state of the art are presented.

The present invention will be further illustrated by these Examples, which are not intended to be limitative but are provided solely for purposes of illustration.

EXAMPLES

A) Synthesis of the Polymers

1. Synthesis of the maleic anhydride - alkyl methacrylate copolymers.

Examples 1–7

In a 4 L 4-neck round-bottomed flask with a sword-shaped stirrer, a reflux condenser, and an internal thermometer, 1000 g isodecyl methacrylate and maleic anhydride in the specified weight ratios, and 500 or 180 g (Example 3 or 5) naphthene-based oil, were heated to 75° C. under stirring. By passage of $N_2$ the solution was freed of oxygen within 1 hr. Then the polymerization was initiated with 0.2 g tert-butyl pivalate and 0.2 g tert-butyl perbenzoate. After 1 hr the temperature was increased to 130° C., and in Examples 3 and 5 an additional 320 g oil was added as a diluent. 5 hr after the start of the reaction, 1 g tert-butyl perbenzoate was added for after-polymerization, and an additional 500 g oil was added as a diluent.

The total duration of the polymerization was 16 hr. The product was a clear, reddish brown, viscous solution with 50 wt. % polymer content. As a rule, conversion was >97%.

Comparative Example 1

The manufacturing method was analogous to that of Example 1, but without maleic anhydride.

Comparative Examples 2 and 3

In a 1 L 4-neck round-bottomed flask with a sword-shaped stirrer, a reflux condenser, and an internal thermometer, 500 g toluene, 52.8 g methyl acrylate or n-butyl acrylate, and 2.8 g maleic anhydride were heated to 70° C., under stirring. After this temperature was reached, the reaction was initiated with 0.11 g tert-butyl perpivalate. Then 422.2 g methyl acrylate or n-butyl acrylate, 22.2 g maleic anhydride, and 1.33 g tert-butyl perpivalate were added portionwise over a period of 3 hr. 3 hr after completion of the additions, 1.0 g tert-butyl perpivalate was added for after-polymerization. The total duration of the polymerization was 10 hr. The product was a clear, colorless, viscous solution with 50 wt. % polymer content.

The polymer was isolated by evaporation concentration on a rotational evaporator, and was dried 12 hr at 70° C. in a vacuum drying cabinet.

B) Manufacturing and testing of polymer-modified bitumens (PmBs)

General method of manufacturing PmBs

A commercially available standard bitumen was heated to 150° C. in a flask with a sword-shaped stirrer. At this temperature, the given additive as specified in Tables 2–4 was added in the amount indicated, in the form of a 50% polymer solution in oil. The mixture was stirred 1 hr. After this period, in every case the polymer had been completely mixed in, and the resulting PmB was homogeneous and smooth.

The following tests were performed on the PmBs:
i) Ductility according to DIN 52 013.
ii) Softening point, "RuK", according to DIN 52 011.
iii) Elastic resilience according to PmB T1 89*, Sec. 3.2.1.
iv) Homogeneity following hot storage at 180° C. (tube test), according to PmB T1 89, Sec. 3.2.1. (* PmB T1 89 represents "Technische Lieferbedingung fuer polymermodifiziertes Bitumen 1989".)

In Table 1, infra, the polymers which were synthesized (the inventive and the comparison polymers) are described.

Tables 2–4 present test results on the present PmBs, and Table 5 presents test results on the PmBs which PmBs were prepared according to the state of the art.

TABLE 1

| Polymer | Amounts of the monomers used | Solvent | $\eta_{sp}/c$ (ml/g) |
|---|---|---|---|
| Example 1 | 990 g isodecyl methacrylate<br>10 g maleic anhydride | 1000 g oil | 81 |
| Example 2 | 980 g isodecyl methacrylate<br>20 g maleic anhydride | 1000 g oil | 78 |
| Example 3 | 980 g isodecyl methacrylate<br>20 g maleic anhydride | 1000 g oil | 114** |
| Example 4 | 950 g isodecyl methacrylate<br>50 g maleic anhydride | 1000 g oil | 70 |
| Example 5 | 950 g isodecyl methacrylate<br>50 g maleic anhydride | 1000 g oil | 110** |
| Example 6 | 925 g isodecyl methacrylate<br>75 g maleic anhydride | 1000 g oil | 49 |
| Example 7 | 900 g isodecyl methacrylate<br>100 g maleic anhydride | 1000 g oil | 57 |

TABLE 1-continued

| Polymer | Amounts of the monomers used | Solvent | $\eta_{sp}/c$ (ml/g) |
|---|---|---|---|
| Comparison Example 1 | 1000 g isodecyl methacrylate | 1000 g oil | 91 |
| Comparison Example 2 | 475 g methyl acrylate<br>25 g maleic anhydride | 500 g toluene | 41 |
| Comparison Example 3 | 475 g butyl acrylate<br>25 g maleic anhydride | 500 g toluene | 46 |

*$\eta_{sp}/c$ estimated in Chloroform (DIN 7745)
**Start concentration of the monomers: 90%

TABLE 2

| Bitumen | Amount of Additive | Ductility at 13° C. (cm) | Softening point "RuK" (°C.) | Elastic resilience (%) | Homogeneity (°C.) |
|---|---|---|---|---|---|
| 1000 g | — | >150 | 48.9 | 19 | — |
| 920 g | 80 g Example 1 | >150 | — | 65 | 1.2 |
| 940 g | 60 g Example 1 | — | — | 72 | — |
| 960 g | 40 g Example 1 | — | — | 75 | — |
| 920 g | 80 g Example 2 | >100 | 43.8 | 68 | 1.6 |
| 940 g | 60 g Example 3 | >150 | 44.2 | 59 | 0.4 |
| 920 g | 80 g Example 4 | >150 | — | 56 | 0.5 |
| 940 g | 60 g Example 5 | >150 | 45.1 | 59 | 1.3 |
| 920 g | 80 g Comparison Example 1 | >100 | — | 31 | 2.2 |
| 940 g | 60 g Comparison Example 1 | >100 | — | 26 | 1.0 |

TABLE 3

Bitumen B 200 from a different German refinery

| Bitumen | Amount of Additive | Ductility at 13° C. (cm) | Softening point "RuK" (°C.) | Elastic resilience (%) | Homogeneity (°C.) |
|---|---|---|---|---|---|
| 1000 g | — | >100 | 38.4 | 25 | — |
| 940 g | 60 g Example 3 | >150 | — | 53 | 0.0 |
| 940 g | 60 g Example 5 | >100 | — | 58 | 0.4 |
| 960 g | 60 g Comparison Example 1 | >150 | — | 36 | 0.4 |

TABLE 4

Bitumen B 80 from a different German refinery

| Bitumen | Amount of Additive | Ductility at 13° C. (cm) | Softening point "RuK" (°C.) | Elastic resilience (%) | Homogeneity (°C.) |
|---|---|---|---|---|---|
| 1000 g | — | 47 | 47.9 | 13 | — |
| 940 g | 60 g Example 5 | >150 | 49.7 | 52 | 0.0 |
| 970 g | 30 g Example 5 (100% polymer) | 77 | 53.1 | 53 | 0.4 |
| 940 g | 60 g Comparison Example 1 | >150 | — | 17 | 1.0 |

TABLE 5

Bitumen B 80 from a different German refinery

| Bitumen | Amount of Additive | Ductility at 13° C. (cm) | Softening point "RuK" (°C.) | Elastic resilience (%) | Homogeneity (°C.) |
|---|---|---|---|---|---|
| 940 g | 60 g Comparison Example 2 | 90 | 44.5 | 24 | 1.2 |
| 940 g | 60 g Comparison Example 3 | >120 | 44.0 | 25 | 2.3 |

From the characterization of the bitumen mixtures of composition according to Comparison Examples 2 and 3 (Table 5), it is clear that these compositions are inferior to the examples of the present invention in elastic resilience and in ductility. Even though maleic anhydride is used as a comonomer in amounts comparable to those used in the present examples, the properties shown in Table 5 are not superior to those of the bitumen mixtures prepared with the PAMA homopolymer according to Comparison Example 1.

Having described the present invention, it will be readily apparent to one of ordinary skill in the art that many changes and modifications may be made to the above-described embodiments without departing from the spirit and scope of the present invention.

What is claimed as new and desired to be secured by Letters Patent of the United States is:

1. A polymer-modified bitumen having homogeneity, high elastic resilience, good cold flexibility, and high thermal stability, which comprises polymer components in the amount of 0.5-50 wt. %, at least 20 wt. % of which components comprise modifying polyalkyl (meth)acrylates; and wherein the modifying polyalkyl (meth)acrylates consist essentially of units of $C_6$-$C_{28}$-alkyl (meth)acrylates in the amount of 80-99.9 wt. %, maleic anhydride in the amount of 0.1-20 wt. %, and one or more other compounds with not more than one polymerizable double bond in the amount of 0-19.9 wt. %, and said modifying polyalkyl (meth)acrylates being uniformly distributed in the bitumen.

2. The homogeneous polymer-modified bitumen according to claim 1, wherein the modifying polyalkyl (meth)acrylates contain monomer units of maleic anhydride in the amount of 0.5-10 wt. %.

3. The homogeneous polymer-modified bitumen according to claim 1, wherein the PmB further contains maleic anhydride-olefin copolymers as bitumen-modifying polymers, in addition to copolymers of maleic anhydride and alkyl (meth)acrylate.

4. The homogeneous polymer-modified bitumen according to claim 2, wherein the modifying polyalkyl (meth)acrylates contain monomer units of maleic anhydride in the amount of 1-5 wt. %.

5. The homogeneous polymer-modified bitumen according to claim 1, wherein said modifying polyalkyl (meth)acrylates comprise units of $C_8$-$C_{20}$-alkyl methacrylates.

6. The homogeneous polymer-modified bitumen according to claim 1, wherein said modifying polyalkyl (meth)acrylates comprise units of $C_{10}$-$C_{18}$-alkyl methacrylates.

7. The homogeneous polymer-modified bitumen according to claim 1, wherein the modifying polyalkyl (meth)acrylates are used in the amount of 90-99.5 wt. %.

8. A method of manufacturing a polymer-modified bitumen which exhibits homogeneity, high elastic resilient, good cold flexibility, and high thermal stability; which comprises forming a mixture of bitumen and polymer, which mixture contains poly(meth)acrylate in the amount of 0.5-50 wt. %, by mixing a polymer, comprising units of $C_6$-$C_{28}$-alkyl (meth)acrylates in the amount of 80-99.9 wt. %, maleic anhydride in the amount of 0.1-20 wt %, and one or more other compounds with not more than one polymerizable double bond, in the amount of 0-49.8 wt. %.

9. The method according to claim 8, which further comprises adding maleic anhydride - olefin copolymers as polymeric bitumen-modifying agents in addition to and along with the maleic anhydride - alkyl (meth)acrylate polymers.

* * * * *